United States Patent
Penn et al.

(10) Patent No.: US 10,417,488 B2
(45) Date of Patent: Sep. 17, 2019

(54) RE-APPLICATION OF FILTERS FOR PROCESSING RECEIPTS AND INVOICES

(71) Applicant: BlinkReceipt, LLC, Brooklyn, NY (US)

(72) Inventors: Roy Penn, Seattle, WA (US); Court V Lorenzini, Mercer Island, WA (US)

(73) Assignee: BlinkReceipt, LLC, Brooklyn, NY (US)

( * ) Notice: Subject to any disclaimer, the term of this patent is extended or adjusted under 35 U.S.C. 154(b) by 0 days.

(21) Appl. No.: 15/643,192

(22) Filed: Jul. 6, 2017

(65) Prior Publication Data
US 2019/0012538 A1 Jan. 10, 2019

(51) Int. Cl.
*G06K 9/00* (2006.01)

(52) U.S. Cl.
CPC ..... *G06K 9/00442* (2013.01); *G06K 2209/01* (2013.01)

(58) Field of Classification Search
CPC .......................... G06K 9/0042; G06Q 20/209
USPC ........................................................ 382/190
See application file for complete search history.

(56) References Cited

U.S. PATENT DOCUMENTS

| | | |
|---|---|---|
| 7,158,948 B1 | 1/2007 | Rodriguez et al. |
| 7,428,988 B1 | 9/2008 | Starr |
| 7,780,081 B1 | 8/2010 | Liang |
| 8,219,558 B1 | 7/2012 | Trandal et al. |
| 8,805,125 B1* | 8/2014 | Kumar .................. G06Q 20/34 382/309 |
| 9,922,375 B1 | 3/2018 | Neveu |
| 2002/0165872 A1 | 11/2002 | Meltzer et al. |
| 2004/0083134 A1 | 4/2004 | Spero et al. |
| 2004/0098664 A1 | 5/2004 | Adelman et al. |
| 2006/0262910 A1 | 11/2006 | Molnar et al. |
| 2008/0219543 A1 | 9/2008 | Csulits et al. |
| 2008/0288509 A1 | 11/2008 | Mysen et al. |
| 2008/0313165 A1 | 12/2008 | Wu et al. |
| 2009/0006151 A1 | 1/2009 | Zarghami et al. |
| 2009/0110287 A1* | 4/2009 | Bates ..................... G06K 9/325 382/190 |
| 2010/0017314 A1 | 1/2010 | Johnson et al. |
| 2010/0082454 A1* | 4/2010 | Narayanaswami .... G06Q 20/20 705/26.1 |
| 2010/0185368 A1 | 7/2010 | Schneider et al. |

(Continued)

*Primary Examiner* — Justin P. Misleh
(74) *Attorney, Agent, or Firm* — Athorus, PLLC

(57) ABSTRACT

Systems and methods for automatic processing of receipts to capture data from the receipts are presented. Upon receiving an image of a receipt, an optical character recognition (OCR) of the receipt content embodied in the image is executed. The OCR of the receipt content results in machine-encoded text content of the receipt content embodied in the image. Tokens are generated from the machine-encoded text content and data groups are constructed according to horizontal lines of generated tokens. Potential product items are identified for at least some of the constructed data groups and the potential product items are evaluated for the at least some constructed data groups. The evaluation of the potential product items for the at least some constructed data groups identifies receipt data, such as product items and vendor information, associated with the least some constructed data groups. The identified receipt data is captured and stored with the image of the receipt in a data store.

20 Claims, 10 Drawing Sheets

(56) References Cited

U.S. PATENT DOCUMENTS

| | | |
|---|---|---|
| 2010/0217678 A1 | 8/2010 | Goncalves |
| 2010/0306080 A1 | 12/2010 | Trandal et al. |
| 2011/0052075 A1 | 3/2011 | Comay et al. |
| 2011/0313917 A1 | 12/2011 | Lawson et al. |
| 2012/0185368 A1 | 7/2012 | Schloter et al. |
| 2012/0189186 A1 | 7/2012 | Csulits et al. |
| 2013/0009774 A1 | 1/2013 | Sabeta |
| 2013/0201307 A1 | 8/2013 | Schloter et al. |
| 2014/0003727 A1 | 1/2014 | Lortz et al. |
| 2014/0006198 A1 | 1/2014 | Daly et al. |
| 2014/0064618 A1 | 3/2014 | Janssen, Jr. |
| 2014/0249947 A1 | 9/2014 | Hicks et al. |
| 2015/0153982 A1 | 6/2015 | Berarducci et al. |
| 2015/0161704 A1 | 6/2015 | Lempel |
| 2015/0379887 A1* | 12/2015 | Becker ................ G06Q 10/101 715/229 |
| 2016/0180467 A1 | 6/2016 | Griffin et al. |
| 2016/0371632 A1 | 12/2016 | Lorenzini et al. |
| 2017/0083968 A9 | 3/2017 | Hicks et al. |

* cited by examiner

RE-APPLICATION OF FILTERS FOR PROCESSING RECEIPTS AND INVOICES

CROSS-REFERENCE TO RELATED MATTERS

This application is related to co-pending and commonly assigned U.S. patent application Ser. No. 15/238,620, filed Aug. 16, 2016, and entitled "Automated Processing of Receipts and Invoices," the entirety of which is incorporated herein by reference. This application is also related to co-pending and commonly assigned U.S. patent application Ser. No. 15/046,163, filed Feb. 17, 2016, and entitled "Capturing Product Details of Purchases," the entirety of which is incorporated herein by reference.

BACKGROUND

Receiving a receipt as evidence of a sale of goods or provision of services is a ubiquitous part of our life. When you go to a grocery store and make a purchase of one or more items, you receive a receipt. When you purchase fuel for your car, you receive a receipt. Indeed, receipts permeate all aspects of transactions. Generally speaking, receipts evidence a record of a transaction. Receipts itemize the goods or services that were purchased, particularly itemizing what (goods and/or services) was purchased, the quantity of any given item that was purchased, the price of the items) purchased, taxes, special offers and/or discounts generally applied or for particular items, the date (and often the time) of the transaction, the location of the transaction, vendor information, sub-totals and totals, and the like.

There is no set form for receipts. Receipts may be printed on full sheets of paper, though many point of sale machines print receipts on relatively narrow slips of paper of varying lengths based, frequently, on the number of items (goods or services) that were purchased. While receipts itemize the items that were purchased, the itemizations are typically terse, cryptic and abbreviated. One reason for this is the limited amount of space that is available for descriptive content. Further, each vendor typically controls the descriptive "language" for any given item. Even different stores of the same vendor will utilize distinct descriptive language from that of other stores. As a consequence, while the purchaser will typically be able to decipher the itemized list of purchased items based on knowledge of what was purchased, a third party will not: the itemized list of purchased items does not lend itself to fully describing the purchases.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for automatic processing of receipts to capture data from the receipts are presented. Upon receiving an image of a receipt, an optical character recognition (OCR) of the receipt content embodied in the image is executed. The OCR of the receipt content results in machine-encoded text content of the receipt content embodied in the image. Tokens are generated from the machine-encoded text content and likely interpretations of the tokens are determined. At least some of the generated tokens are aggregated and potential items of content are identified. The potential items of content are stored with the image of the receipt in a data store.

According to additional aspects of the disclosed subject matter, a method for processing a receipt is presented. The method comprises receiving an image of a receipt and executing an optical character recognition (OCR) of the receipt content embodied in the image. In operation, the OCR of the receipt content results in machine-encoded text content. Tokens are generated from the machine-encoded text content. By way of definition, a token comprises one or more horizontally contiguous text characters that are displayable (non-whitespace characters). Contiguity is determined by white space: if two characters are separated by a white-space character (a white space intended to separate contiguous characters), the two characters are not contiguous. At least some of the generated tokens are aggregated and potential items of content are identified. The potential items of content are stored with the image of the receipt in a data store.

According to still further aspects of the disclosed subject matter, a computer device for processing a receipt is presented. The computing device includes a processor and a memory, wherein the processor executes instructions stored in the memory as part of or in conjunction with additional components to process the receipt. These additional components include a receipt processor. In operation, the receipt processor is configured to receive an image of a receipt and capture and store items of content of the receipt in a data store. Additionally, the computing device includes an Optical Character Recognition (OCR) component that, in execution, transcribes the receipt content embodied in the image of the receipt into machine-encoded text content. A token generator generates tokens from the machine-encoded text content from the OCR component and a data group generator constructs data groups according to horizontal lines of tokens of the receipt. A matching component then identifies potential items of content according to aggregated generated tokens or the data groups. The potential items of content are stored in a data store in association with the receipt image.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
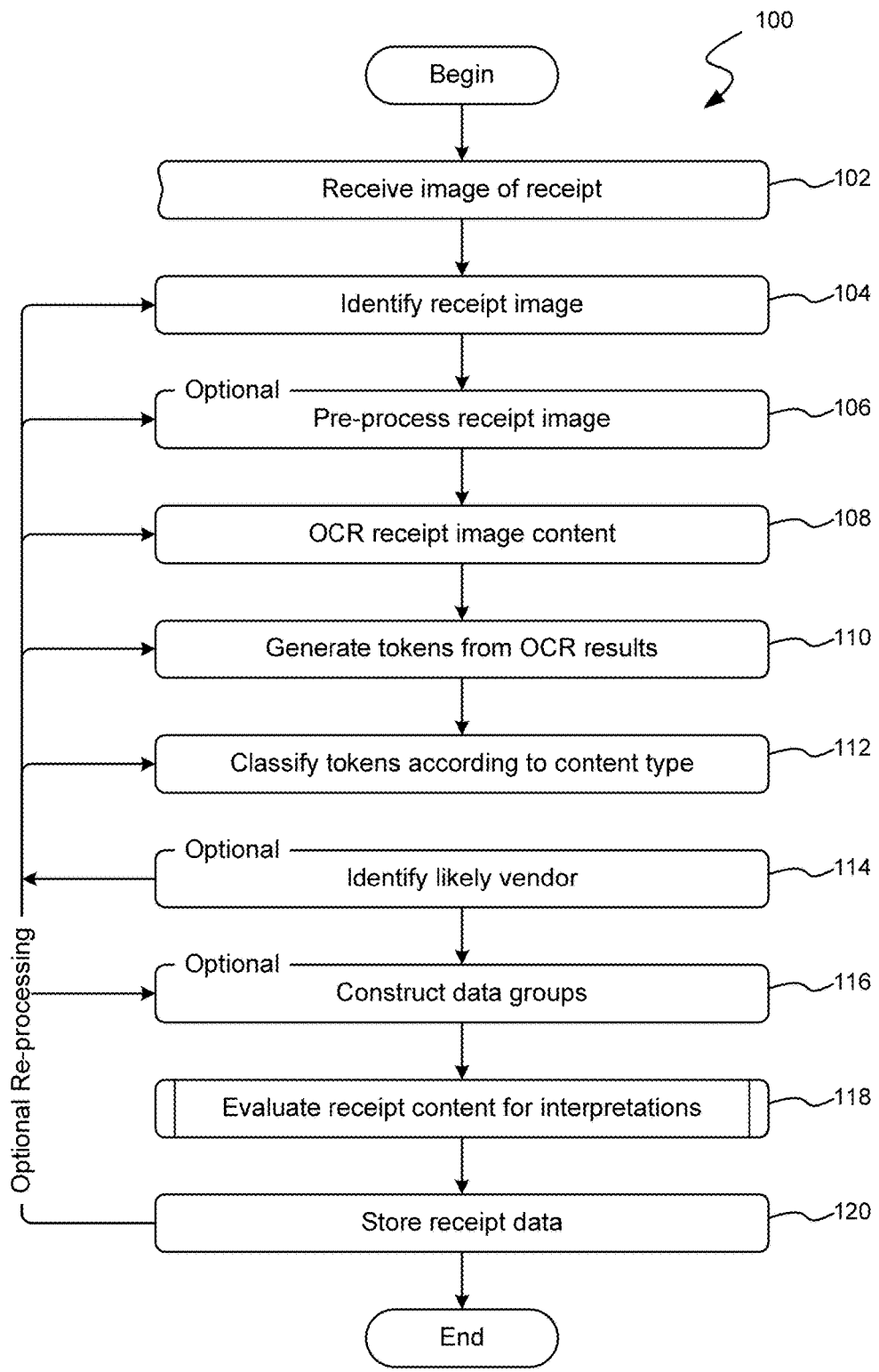
FIG. 1 represents a flow diagram illustrating an exemplary routine for processing an image of a receipt.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

For purposed of clarity and definition, a "receipt" is a record or evidence of a transaction for goods and/or services that is provided to the purchaser. While many receipts are on a printed page, various aspects of the disclosed subject matter may be suitable applied to receipts that are transmitted electronically, such as images and/or text-based receipts.

The term "receipt image" should be interpreted as that portion of an image that constitutes the subject matter of a receipt to be processed. For purposes of clarity and definition, a receipt image is differentiated from an "image of a receipt" in that an image of a receipt may include extraneous data, i.e., content that is not processed as part of a receipt. For example, a purchaser may take an image of a receipt, where the image includes the receipt, but may also include other subject matter that is not part of the receipt. As will be described in greater detail below, as part of the disclosed subject matter, one or more steps are taken to identify and isolate the receipt image (a subsection of the image of the receipt) such that the receipt image includes only content found on the receipt.

The subsequent description is set forth in regard to processing receipts as embodied in a receipt image. While the disclosed subject matter is suitable for advantageously processing receipts, the same subject may be suitably applied to invoices. While a receipt often lists the particular items of purchase, an "invoice" is a document/record that more particularly itemizes a transaction between a purchaser and a seller/vendor. By way of illustration, an invoice will usually include the quantity of purchase, price of goods and/or services, date, parties involved, unique invoice number, tax information, and the like. Accordingly, while the description of the novel subject matter is generally made in regard to processing receipts, it is for simplicity in description and should not be construed as limiting upon the disclosed subject matter. Indeed, the same novel subject matter is similarly suited and applicable to processing invoices.

While aspects of the disclosed subject matter are presented in a described order, and particularly in regard to the description of various aspects of processing receipt images to identify purchase data represented by the underlying receipts, it should be appreciated that the order is a reflection of the order of presentation in this document and should not be construed as a required order in which the described steps must be carried out.

As suggested above and according to aspects of the disclosed subject matter, systems and methods for processing receipt images to identify receipt data and information represented by the underlying receipts are presented. Upon receiving an image of a receipt, processing steps are carried out to identify the receipt data/information represented by the receipt. These processing steps include identifying subsection of the image, referred to as the receipt image, to which processing of data is restricted in order to optimize the identification of the underlying purchase information. At least some of these aspects are set forth in regard to FIG. 1 described below.

Figure 2:
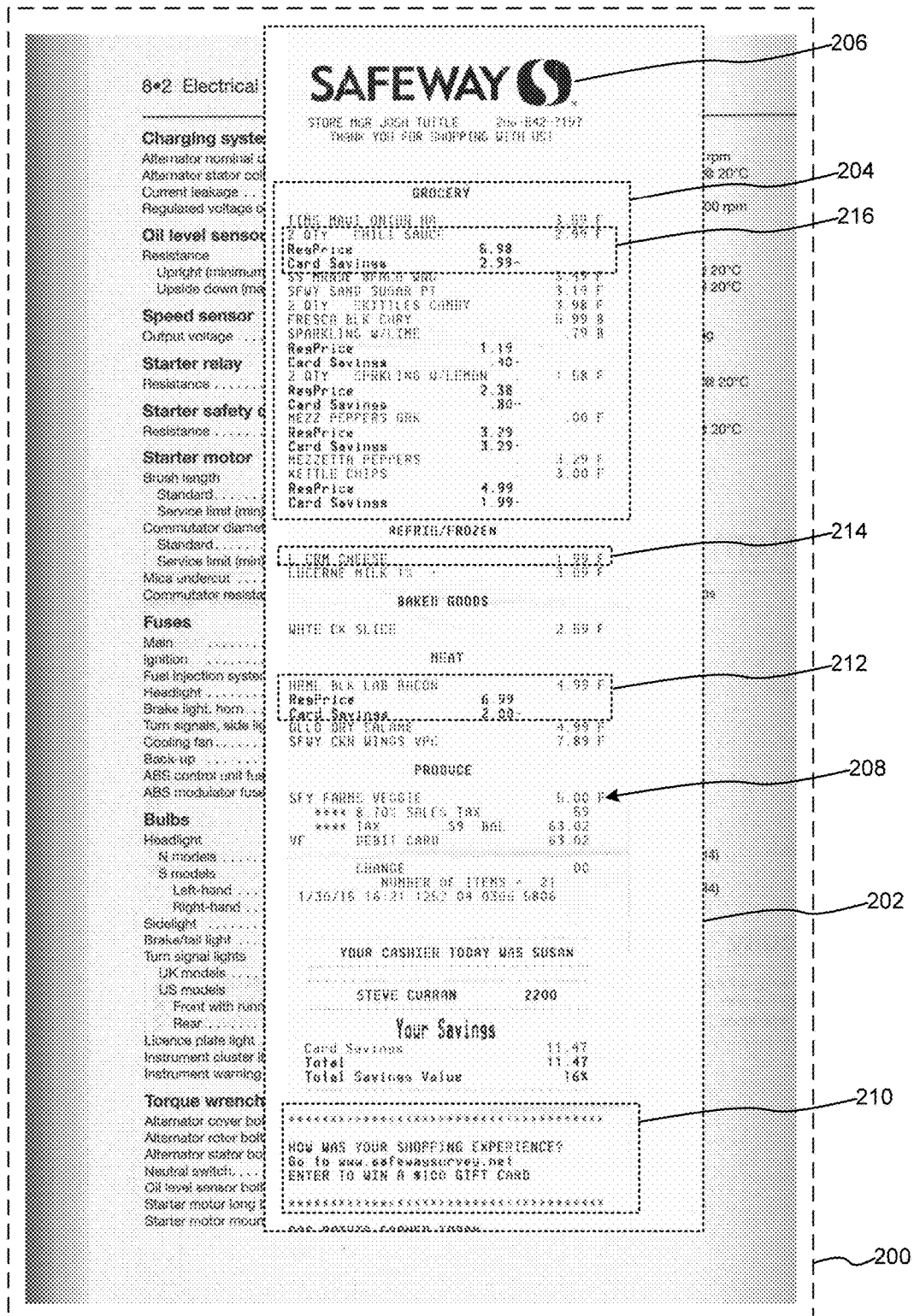
FIG. 2 is a pictorial diagram illustrating an exemplary image that includes a receipt that may be received or obtained for processing by the exemplary routine of FIG. 1.

Turning to FIG. 1, this figure represents a flow diagram illustrating an exemplary routine 100, as may be implemented by a suitably configured computing device or other online service, for processing an image of a receipt. Beginning at block 102, an image of a receipt is received or obtained. By way of illustration and example, FIG. 2 is a pictorial diagram illustrating an exemplary image of a receipt 200 that includes the content of a receipt that may be received or obtained for processing by the exemplary routine 100 of FIG. 1.

As suggested above, the image of a receipt may include other items or content that are not necessarily part of the receipt itself. For example, the receipt depicted in FIG. 2 was used as a bookmark and the image of the receipt 200 was taken by a camera without removing the receipt from the book, and without cropping out the "extra" information that comprises the content of the book. Thus, at block 104, the exemplary routine 100 identifies the receipt image 202 of the received image 200. As indicated above, a receipt image 202 corresponds to that portion of a received image that represents the subject matter or content of a receipt to be processed. By way of illustration, receipt image 202 is a sub-image of image 200 and corresponds to the receipt content to be processed. According to aspects of the disclosed subject matter, the receipt image 202 of a received image may be determined according to various heuristics and rules, generally referred to as image filters. These image filters include, by way of illustration and not limitation: edge and/or border detection within the received image (e.g., straight lines corresponding to edges of paper may be captured in the received image); color differentials (e.g., the page color of the book is darker in shade while the paper color of the receipt image 202 is lighter); structural arrangement of content within an area of the received image (e.g., arrangements of 2 or 3 columns of data, especially in close proximity to each other, and/or tabular data may indicate receipt data and therefore, the receipt image 202); anticipated paper sizes and/or anticipated widths of receipt paper; and the like. Moreover, in identifying the receipt image 202, changes may be made to color interpretation within the image, determination and/or change of the orientation of the image, white balance, contrast, zoom levels, and the like.

In addition to identifying a receipt image 202, at block 106 optional pre-processing of the receipt image, or of the image of the receipt, may be conducted. In pre-processing the receipt image, the routine 100 examines various aspects of the receipt and may take various corresponding actions in order to place the receipt in an optimal condition for further processing, e.g., for conducting optical character recognition on the content of the receipt. By way of illustration and not limitation, pre-processing of the receipt image may include edge and/or border detection within the received image (e.g., straight lines corresponding to edges of paper may be captured in the received image); color differentials (e.g., the page color of the book is darker in shade while the paper color of the receipt image 202 is lighter); blur detection and correction, document rotation and alignment, brightness and contrast of the content, and the like. Detection of these, and other, aspects of the image may cause the pre-processing step to also carry out one or more corresponding actions, such as modifying brightness and/or contrast of the image, rotating the image such that lines of content are aligned with the horizontal alignment of processing, and the like.

At block 108, an optical character recognition (OCR) filter/process is applied to the content of the receipt image. As is well known, an OCR process or filter converts textual content embodied in an image into corresponding machine encoded textual content. Moreover, in addition to translating the image content into machine encoded textual content and according to aspects of the disclosed subject matter, the location (i.e., the image area within the receipt image 202) of each character converted in the OCR process is also captured and stored in conjunction with the machine encoded textual character. For example, when converting to machine encoded textual content, the area corresponding to the letter "F" 210 is captured and retained with the machined encoded "F".

At block 110, tokens are generated from the results of the OCR process. By way of definition, a token corresponds to one or more contiguous text characters. Text characters comprise displayable characters (non-white space characters) that have a corresponding machine encoded character. Text characters include, by way of illustration and not limitation, numeric characters, alphabetic characters, symbols, and the like. While so-called "white space" characters (e.g., spaces, tabs, returns, gutters, and the like) are arguably "displayable" as they occupy space within a receipt, for purposes of the disclosed subject matter white space characters are considered to be non-displayable content. Contiguity is delineated by white space and determined horizontally: if two text characters (arranged horizontally) are separated by one or more white-space characters (white space generally utilized and intended to separate contiguous characters), the two characters are not contiguous. For example, the various characters in box 214 yield the following terms: "L" "CRM" "CHEESE" "1.99" and "F". Characters that may be viewed or perceived as contiguous vertically are not considered contiguous for purposes of generating tokens. Additionally and according to aspects of the disclosed subject matter, tokens may be identified and filtered according to known information regarding the receipt. By way of illustration and not limitation, knowledge the language utilized in the receipt, and/or the vendor issuing the receipt may be utilized to more accurately identify tokens.

At block 112, in addition to generating tokens from the results of the OCR process, once generated the tokens are also classified as to what the subject matter of the token likely represents. By way of illustration and not limitation, a token may be classified as any one of a plurality of token classes including, by way of illustration only, price, descriptive content, product data, address data or some portion of an address, zip code, phone number, quantity, store code, and the like. Of course, classifying the token as "unknown token" is also a possibility as it may not always be possible to determine the type/class of content for any given token.

At block 114, information regarding the vendor is optionally identified (in circumstances in which such information has not already been identified.) As suggested above, knowing the vendor that issued the receipt may be highly useful in identifying and classifying tokens as well as understanding the grouping of multi-lined entries, comments, and the like. A vendor may be identified according to interpreted tokens (viewed as keywords), the organization and/or arrangement of content in the receipt image, and the like. Additionally, while the identification of the vendor is recited in FIG. 1 as having occurred after the tokens are generated, or even after an OCR process is conducted, it should be appreciated that this is illustrative only and should not be viewed as limiting upon the disclosed subject matter. Indeed, the particular order of many of the steps of this exemplary routine 100 is illustrative and not mandatory, where the steps be re-arranged and/or re-ordered without departing from the intent of the claimed subject matter.

At block 116, data groups are optionally constructed from the content/tokens derived from the receipt image 202. Data groups are defined as a group of tokens that are viewed as collectively forming a discrete element of the receipt (a receipt element). Each discrete element may comprise a set of data/information (constructed from tokens) corresponding to some item of content or transaction within the receipt, such as a purchased item or items including multiple instances of the same item (e.g., a data group corresponding to the purchase of two boxes of the same product), an address, an informational message, an address, a total and/or sub-total, tax information, purchase instrument information (cash, check, debit card, credit card, etc.), reward and/or loyalty data, store name and/or logo, etc. A data group typically corresponds to an item of receipt data that is stored with regard to the receipt. By way of illustration and not limitation, constructing data groups comprises aggregating tokens and/or characters horizontally that, according to analysis, appear to be a horizontally arranged set of content. Data groups may correspond to one or more specific items) of purchase. While most purchased items will occupy at least one line of content, there are often cases in which a data group may span multiple horizontal lines. Thus, in any given receipt the description of a purchased item or service may extend over multiple lines and are optionally aggregated into a single data group. For example, a purchased item as identified in box 212 corresponds to the purchase of a package of Hormel Black Label Bacon and the content relating that purchased item spans multiple lines. Similarly, the data group of box 216 corresponds to the purchase of two containers of Chili Sauce, where the data group spans multiple lines. In contrast, the data group of box 214 corresponds the purchase of one package of Cream Cheese and is entirely described on a single horizontal line.

Additionally, data groups are not necessarily directed to purchased. Accordingly, in various aspects of the disclosed subject matter, a data group may comprise multiple horizontal lines of content of the receipt image 202. For example, the content in box 210 may be viewed as a single data group of the receipt content. As can be seen, often (but not exclusively) additional lines describe various pricing conditions (e.g., regular and/or sale prices), quantities, and the like. Moreover, often though not exclusively, the additional lines of a data group are distinguished according to descriptive subject matter of the purchased item as well as content arrangement (centered text, differing number of columns, pricing information located outside of typical location, typeface, and the like.) While determining data groups may be useful in processing the receipt content, constructing data groups from multiple lines of content is viewed as being an optional step to the process.

At block 118, based on the tokens in the data groups or, the generated tokens if no data groups are generated, and in consideration of any descriptive text, quantities, weights, prices, etc., as well as the identified or potentially identified vendor, one or more content items (such as a data group and/or tokens) are evaluated for their interpretations as to the actual subject matter/data that they represent. Evaluating the content of the receipt image, as represented by data groups and/or tokens, is set forth below in regard to FIG. 3.

Figure 3:
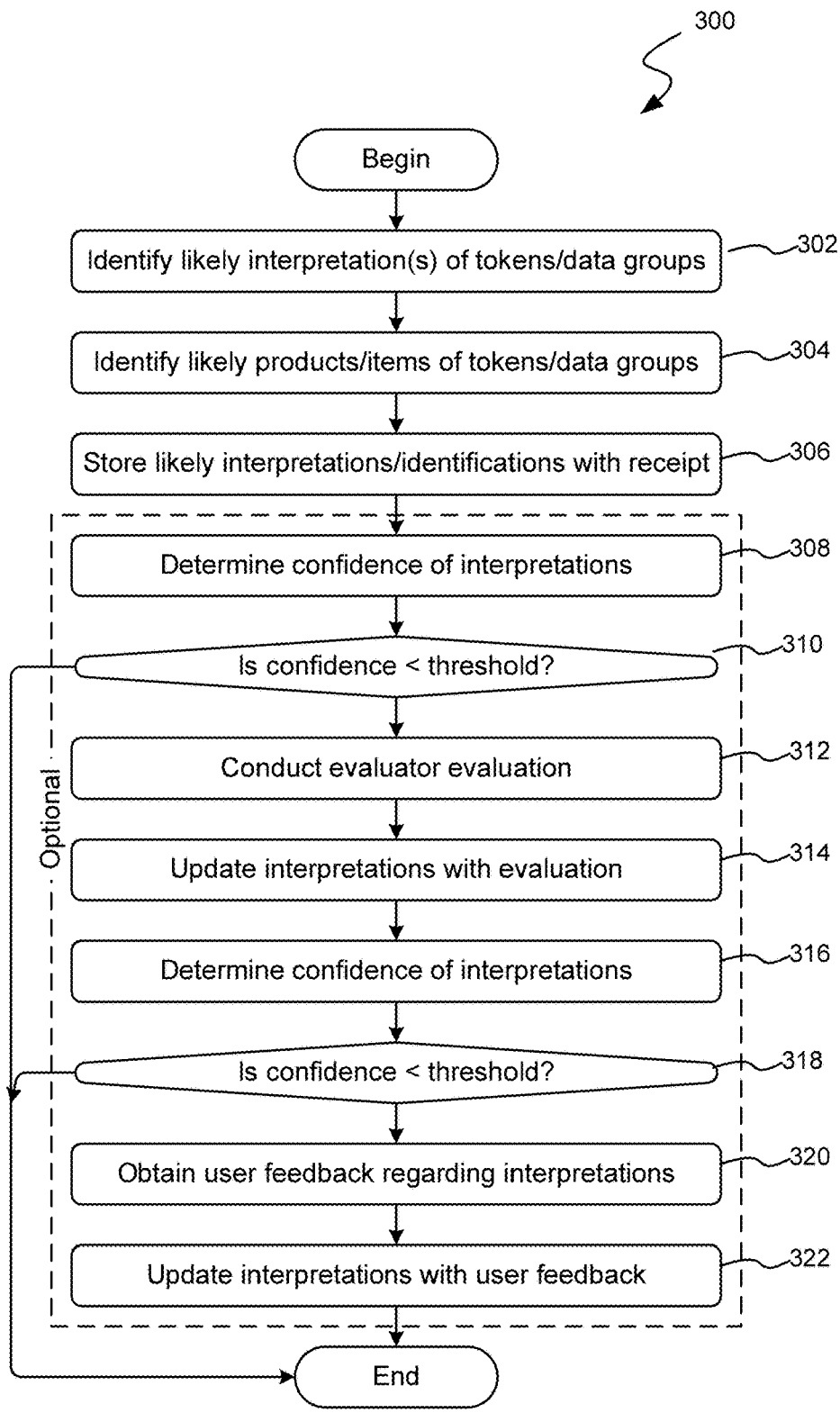
FIG. 3 is a flow diagram illustrating an exemplary routine for evaluating receipt content for interpretations.

FIG. 3 is a flow diagram illustrating an exemplary routine 300 for evaluating receipt content (e.g., data groups and/or tokens) for interpretations. Beginning at block 302, the various interpretations of the tokens of a data group (or a horizontal aggregation of tokens) are combined in various ways, with consideration given to likely interpretations of the tokens, to generate a likely identification of the data group/aggregated tokens. By way of illustration and not limitation, the interpretations are made according to lexical analysis comparisons, template matching, abbreviation matching, abbreviation expansion, spelling and/or grammatical corrections, and the like. The matching may be filtered according to know information including, by way of illustration, actual or potential vendor, data arrangement, and the like.

At block 304, the likely token interpretation is combined in various ways, with consideration given to the most likely interpretations of the tokens, to generate a likely product or item identification of the data group/aggregated tokens. Interpretations may be made according to dictionaries, abbreviation lists, token lists, similarities in consonants of known products and/or labels, etc. For example in regard to FIG. 2, in box 212 the fact that the token "HRML" precedes the token "BLK", and a likely interpretation of "HRML" is the brand name 'Hormel', as well as other information that may or may not be known, and interpretation of the token "BLK" as the word "black" may be considered more likely than the other potential interpretations, the product/item may be identified as "Hormel Black Label Bacon." Similarly, the content "RegPrice" may be interpreted to be "Regular Price" based on the classification of the token, the position of the token with regard to other content, the presence of an apparent price token, "6.99", the location of the price token, and the like. Additionally, while a particular interpretation of one or more tokens may be viewed as "more likely" than other interpretations, for the sake of further processing multiple interpretations may be associated with any given set of tokens or data groups.

At block 306, the likely identifications/interpretations are associated/stored with the regard to the receipt. Additionally, beginning with block 308 and continuing through block 322, these steps are viewed as optional steps with regard to processing the receipt image, not necessary. While they are advantageous in that they may increase the likelihood of correct identification of an item (whether the identification is a product item, a comment or descriptive data, subtotal and total information, vendor information, etc.), they are optional, not mandatory steps of the process.

At block 308, a confidence value is determined, where the confidence value reflects the confidence that the currently iterated aggregated tokens or data group has been correctly identified. The confidence value is an indication of the likelihood that the interpretation of an item of receipt content is correct. According to various non-limiting embodiments, the confidence value may correspond to values within a range, such as between 0.0 and 1.0 where 0.0 represents no confidence and 1.0 represents complete confidence that the product is correctly identified. Alternatively, another range may correspond to numbers between 1 and 100, with 1 as the least confidence and 100 the greatest. Of course, other value ranges or discrete values may be used to represent a confidence score. Additionally, the values of the confidence values are such that they may be compared against predetermined threshold values in order to gauge whether a human evaluator should consider and evaluate the particular potential product item for the corresponding data group.

At decision block 310, a determination is made as to whether the confidence value falls below a confidence threshold. If the confidence value falls below that confidence threshold, at block 312 an evaluation by an evaluator is conducted. The evaluator conducts the evaluation according to a presentation of the various interpretations and aggregations previously associated with the tokens.

Figure 4:
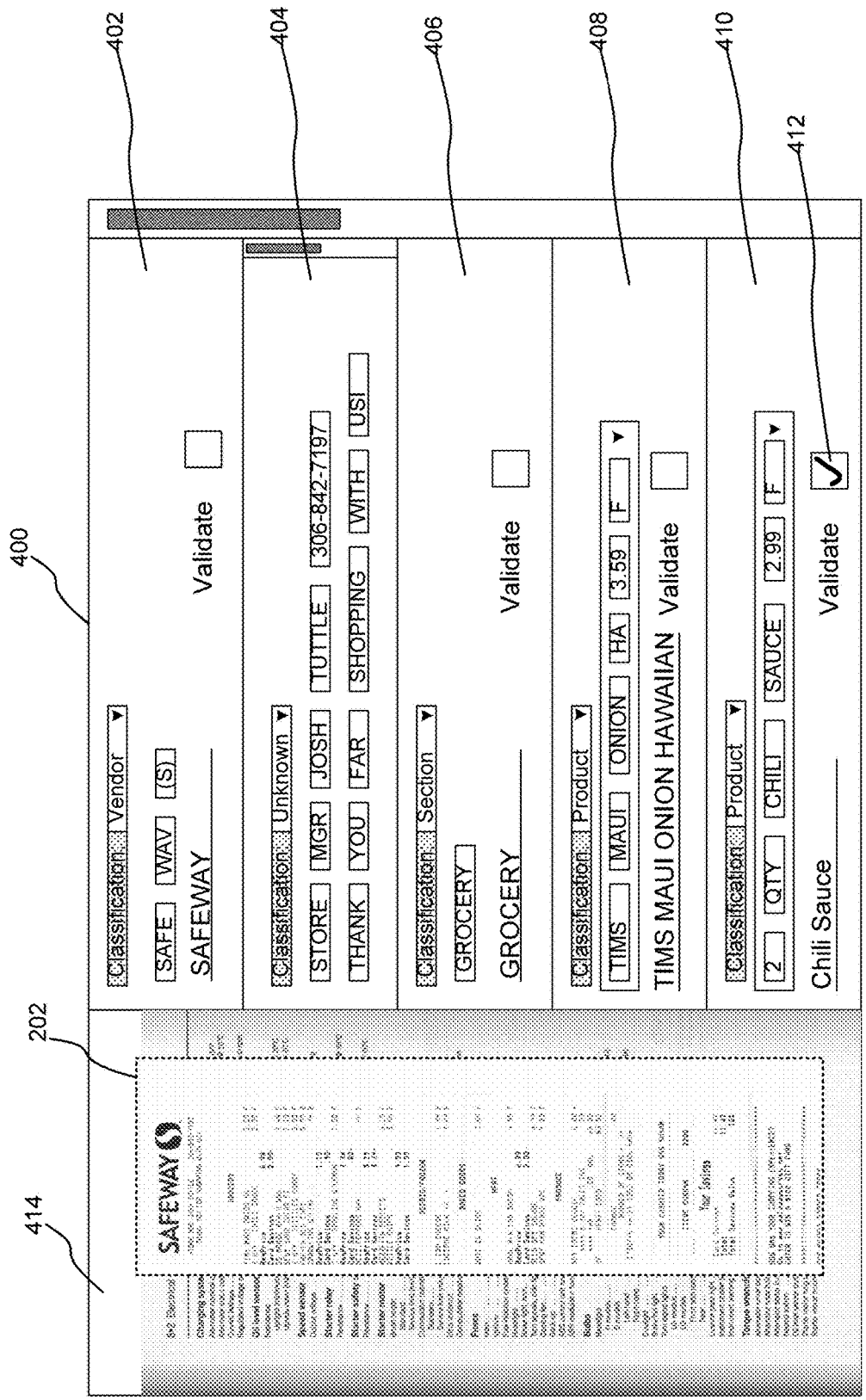
FIG. 4 is a pictorial diagram illustrating an exemplary presentation view in which an evaluator can modify, update, disambiguate, correct, and/or augment information regarding one or more items lines of a corresponding receipt image.

By way of illustration, FIG. 4 is a pictorial diagram illustrating an exemplary presentation view 400 in which an evaluator (a person) can modify, update, disambiguate, correct, and/or augment information regarding one or more items lines of a corresponding receipt image. Indeed, as illustratively shown, the presentation view 400 includes an image view 414 displaying an image of a receipt such that the evaluator can modify the boundaries of the receipt image 202 to correct any automated selection. Also, the presentation view 400 may provide one or more data group tiles, such as data group tiles 402-410, in which the evaluator may examine specific tokens, aggregations of the tokens, potential product item interpretations, and the like, as well as validate any set of product data, such as the product data shown in tiles 404 or 408, as well as vendor data as shown in tile 402, information data, section data as shown in tile 406, and the like. In all of these, the evaluator is able to relate the information in the tile to the content in the image due to the fact that the characters and terms are associated with a particular location within the receipt item 202, which association may be displayed to the evaluator on request. When an evaluator is satisfied with a particular data group or aggregation of tokens, and particular in regard to those interpretations that were viewed as having a low confidence threshold, the evaluator may indicate that the information is validated, e.g., via a validate box 412.

With reference again to FIG. 3, after the evaluation of the evaluator, at block 314 the interpretations of the various items of content are updated and stored according to the determinations of the evaluator.

Even after an evaluator conducts his/her evaluation, or if an evaluator does not evaluate the identified items, one or more items of content (aggregations of tokens or data groups) may need to be clarified. Accordingly, at block 316 another determination is made as to the confidence of the interpretations with regard to one or more identified items of the receipt. Again, at decision block 318, if the determined confidence value falls below a threshold, the routine 300 proceeds to block 320. By way of example, assuming the evaluator was unable to determine whether the vendor information of tile 402 was correctly identified such that confidence for that item remains low, the system may generate a message to the user/purchaser requesting information, such as "Is the vendor for this receipt 'Safeway on Bainbridge Island?"

At block 320, the process 300 obtains user feedback regarding the various interpretations associated with the receipt, and particularly (or specifically) in regard to the items of low confidence. Correspondingly, at block 322, the interpretations associated with the receipt are updated according to the user feedback, i.e., they are stored with the receipt as well as utilized as feedback to those processes (e.g., those described above in blocks 302 and 304) for improved identification accuracy and confidence. Thereafter, routine 300 terminates.

With regard to routine 300, while this routine illustrates that the evaluation by the evaluator is conducted prior to obtaining user feedback, it should be appreciated that either or both of the supplemental evaluations (by the evaluator and by the user associated with the receipt) may be conducted. Moreover, the order in which the supplemental evaluations are conducted is not mandatory: either may be conducted as a first measure in attempting to improve the confidence regarding the interpretations of the items of content of the receipt image.

Returning to routine 100 of FIG. 1, after having evaluated the receipt content to determine likely interpretations, at block 120 the determined receipt data is stored in conjunction with the receipt image. Additionally and according to aspects of the disclosed subject matter, as various receipt items are associated with a higher level of confidence, or confirmed and/or validated through an evaluator or the user/purchaser, the identified information optionally may cause that one or more filters or steps of routine 100 be repeated. For example, assuming that an evaluator modifies the location of the receipt image 202 relative to the image of the receipt 200. Naturally, this change may cause that the routine 100 return to block 106 for additional processing since the new location may cause changes in the results from the previously conducted steps in the routine/process, including the OCR step, vendor identification, token generation, and/or token interpretation. By way of an additional example, if a vendor is validated, then the process may return to block 110 to re-generate tokens based on information associated with a known vendor. As yet another example, the system may automatically identify that the brightness, contrast, and/or zoom levels of the receipt image may be improved and change these aspects with regard to the receipt image. Of course, these changes may substantially impact how the outcome of the OCR process (block 108), which may cause that all or some of the other steps of the routine 100 require reprocessing. Of course, for that information that has been validated by an evaluator or user, such information may be held irrespective of the reprocessing.

As a further part of evaluating the product data, as information becomes established, e.g., a particular abbreviation is determined for a particular vendor, that information is captured by the process and stored as known information. For example, if the tokens of vendor tile 402 are established as "Safeway," then the particular patter of tokens, "SAFE" "WAV" "(S)", may be stored as a known pattern for future reference with regard to vendors. Of course, the steps of generating tokens, constructing data groups, identifying potential product items for corresponding data groups, evaluating the potential product items for the corresponding data groups, and capturing receipt data for the receipt may each be conducted according to known information of the identified vendor, the data structure and arrangement of the receipt, and the particulars aspects of the receipt image 202.

After the evaluation of receipt content (block 120), the storing of receipt data, and any additional reprocessing (with corresponding evaluations and storage), the routine 100 terminates.

Regarding routines 100 and 300 described above, as well as other processes describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines/processes are typically embodied within executable code modules comprising routines, functions, looping structures, selectors and switches such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 5:
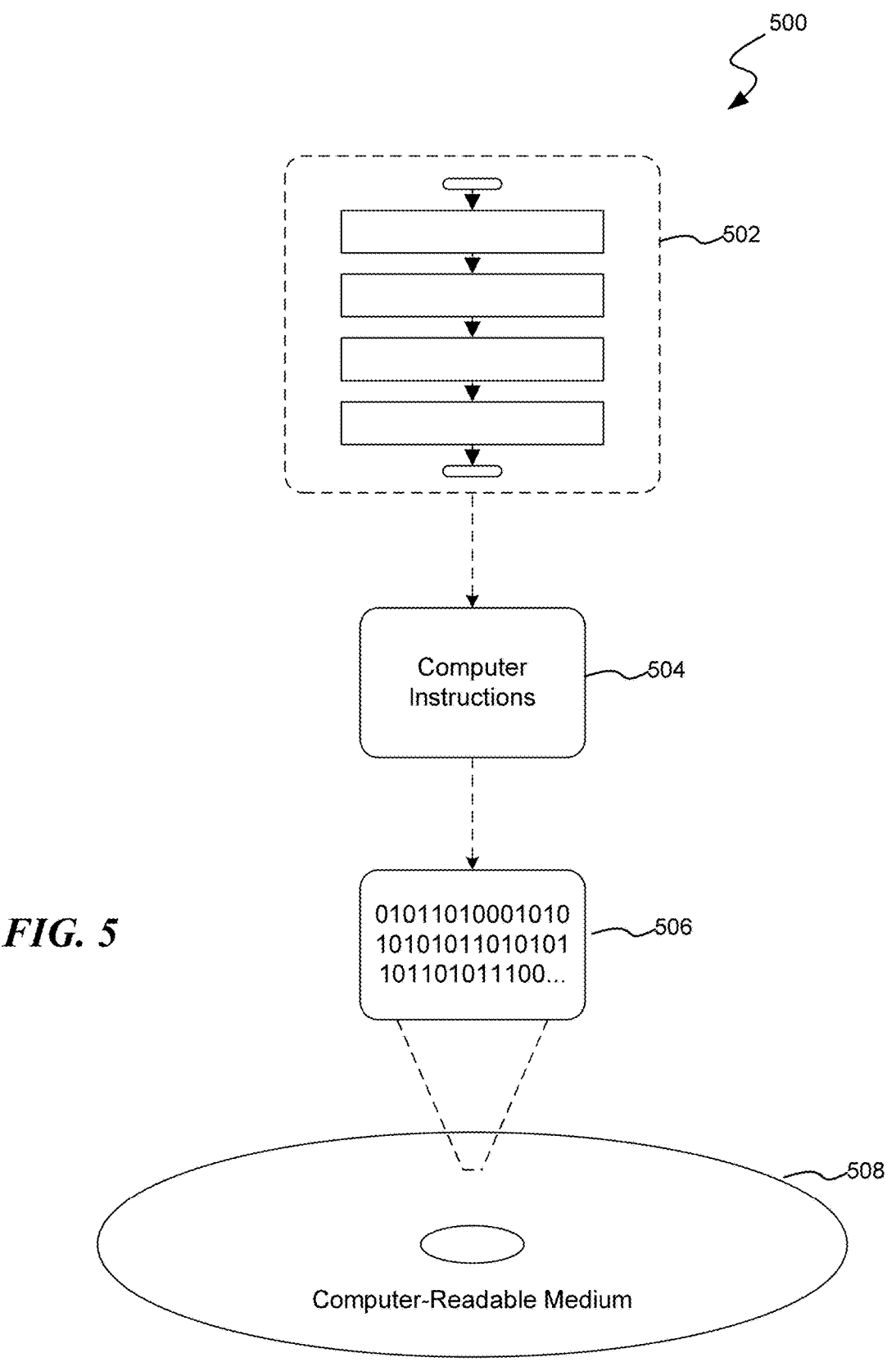
FIG. 5 is a block diagram illustrating an exemplary computer readable medium encoded with instructions to process receipts as described above.

Turning to FIG. 5, FIG. 5 is a block diagram illustrating an exemplary computer readable medium encoded with instructions to process receipts as described above. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment, the processor-executable instructions 504 may be configured to perform a method, such as at least some of the exemplary methods 100 and 300, for example. In another such embodiment, the processor-executable instructions 504 may be configured to implement a system, such as at least some of the exemplary system 600, as described below. Many such computer-readable media may be devised, by those of ordinary skill in the art, which are configured to operate in accordance with the techniques presented herein.

Figure 6:
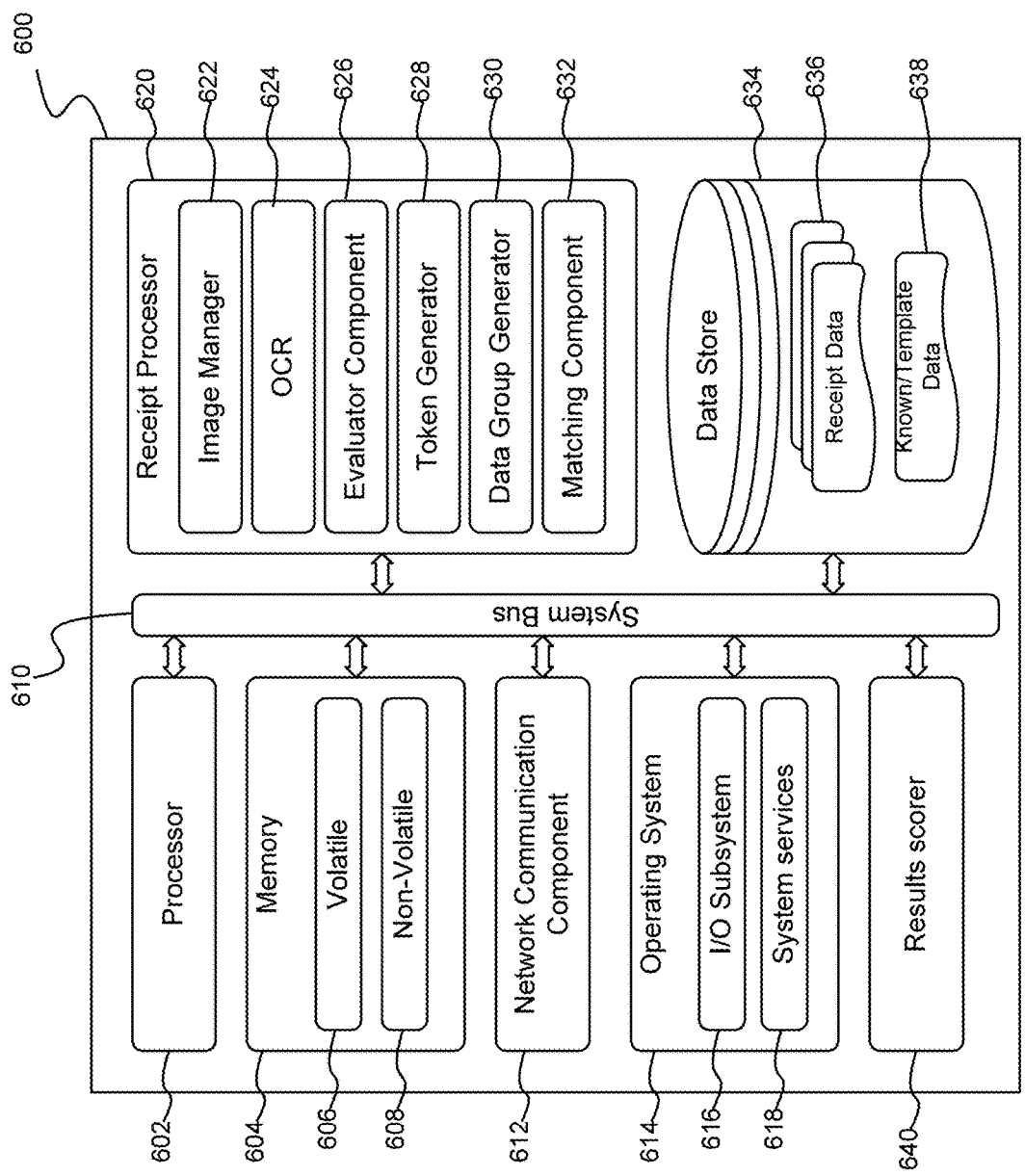
FIG. 6 is a block diagram illustrating an exemplary computing device configured to provide automatic receipt as described herein.

Turning now to FIG. 6, FIG. 6 is a block diagram illustrating an exemplary computing device 600 configured to provide automatic receipt as described herein. The exemplary computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

As will be appreciated by those skilled in the art, the processor 602 executes instructions retrieved from the memory 604 (and/or from computer-readable media, such as computer-readable media 500 of FIG. 5) in carrying out various functions of automated receipt processing as described above. The processor 602 may be comprised of any of a number of available processors such as single-processor, multi-processor, single-core units, and multi-core units.

Further still, the illustrated computing device 600 includes a network communication component 612 for interconnecting this computing device with other devices and/or services over a computer network. The network communication component 612, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

The exemplary user computing device 600 also includes an operating system 614 that provides functionality and services on the user computing device. These services include an I/O subsystem 616 that comprises a set of hardware, software, and/or firmware components that enable or facilitate inter-communication between a user of the computing device 900 and the processing system of the computing device 900. Indeed, via the I/O subsystem 614 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer user and the computing device 600 is enabled via the I/O subsystem 614 of the user computing device. Additionally, system services 618 provide additional functionality including location services, timers, interfaces with other system components such as the network communication component 612, and the like.

The exemplary computing device 600 also includes various executable components, which may be implemented as software components that configure the computing device to operate in processing receipts, as executable hard components, or a combination of hardware and software components. Included in these components is a receipt processor 620 that obtains an image of a receipt 200, executes one or more filters/processes to identify receipt data of the receipt, and capture data from the receipt. These filters include an image manager 622 that, in execution, identifies a receipt image 202 within an image of a receipt, as described above in regard to block 104 of FIG. 1.

Another executable component is the OCR component 624. As suggested above, the OCR component, in execution, causes the textual content of the receipt, as embodiment in the receipt image, to be transcribed to machine encoded textual content. The Evaluator Component 626, in execution, carries out the function of presenting the identified/interpreted results to an evaluator for editing, modification, and/or validation as set forth above in regard to block 312 of FIG. 3 and presentation view 400 of FIG. 4.

The Token Generator 628, in execution, carries out the function of generating tokens from the various characters transcribed from the OCR component 626. As discussed above in regard to block 110, a token corresponds to one or more contiguous text characters (as defined above). Additionally, the Token Generator 628 also optionally classifies the generated tokens according to one of a plurality of token classifications, as described above in regard to block 112 of FIG. 1.

The Data Group Generator 630, in execution, operates to identify data groups within the receipt image according to the tokens identified by the tokenizer 628. The Matching Component 632, in execution, carries out the matching of tokens and sets of tokens to known products, vendors, descriptive text and the like as set forth in regard to routine 300 of FIG. 3.

The data store 634 stores receipt data/information regarding various receipts from multiple vendors, and further stored known data regarding vendors, abbreviations, data arrangement/structures, and the like.

A results scorer 640 operates as an external scoring process for scoring results of the various processing phases, including the OCR phase, the token generation phase, the data group generator phase, and the like. The results scorer 640 may operate as a cooperative process to the receipt processor 620 (as shown) or, alternatively, be a part of the receipt processor (not shown.) A discussion of the results scorer 640, as an external scorer, is set forth below in regard to routine 800 of FIGS. 8A-8C.

In operation, the receipt processor 620, in conjunction with the various filters and processors, operates to carry out the functions described above in regard to routines 100 and 300 of FIGS. 1 and 3, particularly in regard to automated processing of receipts.

Regarding the various components of the exemplary computing devices 600, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Figure 7:
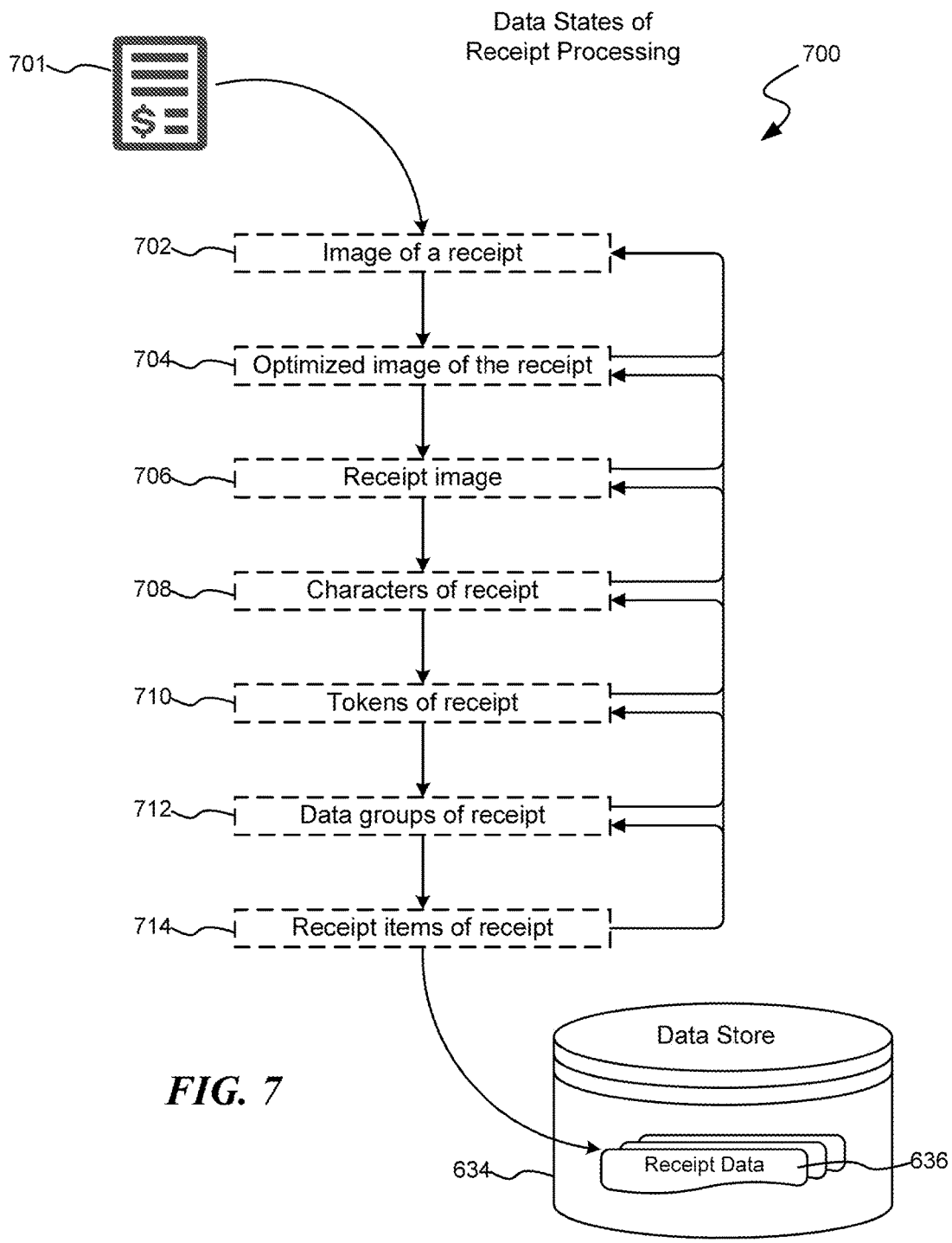
FIG. 7 is a block diagram illustrating various data states in capturing content from an image of a receipt.

While routine 100 of FIG. 1, described above, sets forth an exemplary routine for processing an image of a receipt to extract receipt data corresponding to the subject matter of the receipt, a description of the transition from received image, such as image 202, to receipt data 636, is presented below. In regard to the progression of data, or data states, FIG. 7 is a block diagram illustrating the various data states in capturing content from an image of a receipt. Beginning with an image of a receipt 701, a first state 702 of the content is the image of the receipt itself. After processing, a second state 704 of the content is an optimized image of the receipt. While the optimization here is described after receiving the image and before the identification of a receipt image, as set forth above in the description of routine 100, the optimization of an image may take place after the identification of the receipt image. According to aspects of the disclosed subject matter, the optimization may take place on the image of the receipt, or on the receipt image.

A third, subsequent state 706 corresponds to the receipt image, i.e., that portion of the image of the receipt that corresponds to the receipt content. A fourth state 708 in the processing of content corresponds to characters of the receipt identified according to an OCR process. According to aspects of the disclosed subject matter, as part of the OCR process, each character is associated with its corresponding interpretation/character (i.e., the computer encoded version of the character), a location in the receipt image for that particular character, and a confidence score that the character is correctly identified.

As will be described below, due to processing constraints that may be imposed on the OCR process, a confidence score from the OCR process may be lower that it would be without such constraints. However, the processing constraints are imposed on the OCR process due to knowledge and/or hypotheses about what characters should be identified and/or are expected. As such, an external scoring module may amend or supplant the score of the OCR process to reflect an actual confidence in light of the various processing constraints. With regard to maintaining the location in the receipt image for specific characters, the location is valuable in facilitating human review of the OCR interpretation(s) of a given character which then becomes valuable information in a machine learning environment as a learning sample.

From the characters, a next state 710 is that of tokens of the receipt. As indicated above, tokens are generated from the results of the OCR process (state 708) and each token corresponds to one or more horizontally contiguous text characters. Text characters comprise displayable characters (non-white space characters) that have a corresponding machine encoded character and these aggregations/tokens are delineated by white space characters (including end of line white space characters.) Each token corresponds to the machine encoded content of its constituent characters. Further still, each token is associated with a location in the receipt image from which the constituent characters were interpreted, and further associated with a confidence score that the token content is accurate. As above, maintaining the location in the receipt image for each token is valuable in facilitating human review of the token generation. Such information can then be provided as a sample data point, valuable information in a machine learning environment as a learning sample.

From the tokens, a subsequent set/state 712 of data is that of data groups. As indicated above, a data group is defined as a group of tokens that can be viewed as collectively forming a discrete element of the receipt (a receipt element). Each discrete element may comprise a set of data/information (constructed from tokens) corresponding to some item of content or transaction within the receipt. In other words, a data group is an aggregation of one or more tokens that collectively correspond to a discrete element of the receipt. As with the characters of the receipt and the tokens generated therefrom, each data group is associated with a specific location within the receipt image and is associated with a confidence score as to the correct aggregation of tokens corresponding to a receipt element.

A final state 714 of data produced during the receipt processing is a receipt item. A receipt item typically has a 1:1 correspondence with a generated data group and comprises an interpretation or description of the content/information (in a usable/storable form) of the receipt element. As indicated above, the receipt items are then stored as receipt data 636 corresponding to the receipt embodied in the receipt image in a data store 634.

As can be seen in FIG. 7, while a progression between the various states mentioned above can be conducted, there are often situations in which the results of a particular phase may come into question. For example, while the character "$" may be one of the many characters that are often found in a receipt, a token whose aggregate characters is "$our" is likely not a typical token that is found in a receipt. For purposes of the disclosed subject matter, an anomaly (with regard to the various data states) is a condition that suggests that something was erroneously interpreted or processed. Each phase described in FIG. 7 may produce anomalies that require either a reprocessing of the particular phase, or reprocessing of one or more previous phases. Moreover, each reprocessing may be conducted with regard to a particular item (e.g., a character, token, data group, etc.) or may be conducted with regard to the entire set of data of that repeated phase. With regard to the example above, upon detecting that the aggregation of tokens, "$our", is likely an error (i.e., detecting an anomaly), that portion corresponding to the character "$" of the token may be reprocessed (from OCR or earlier), the aggregation may be reprocessed, or the entire set of data may be reprocessed. Processing, evaluating for anomalies, and reprocessing the contents of the image of the receipt are set forth in regard to FIGS. 8A-8C.

Figure 8A:
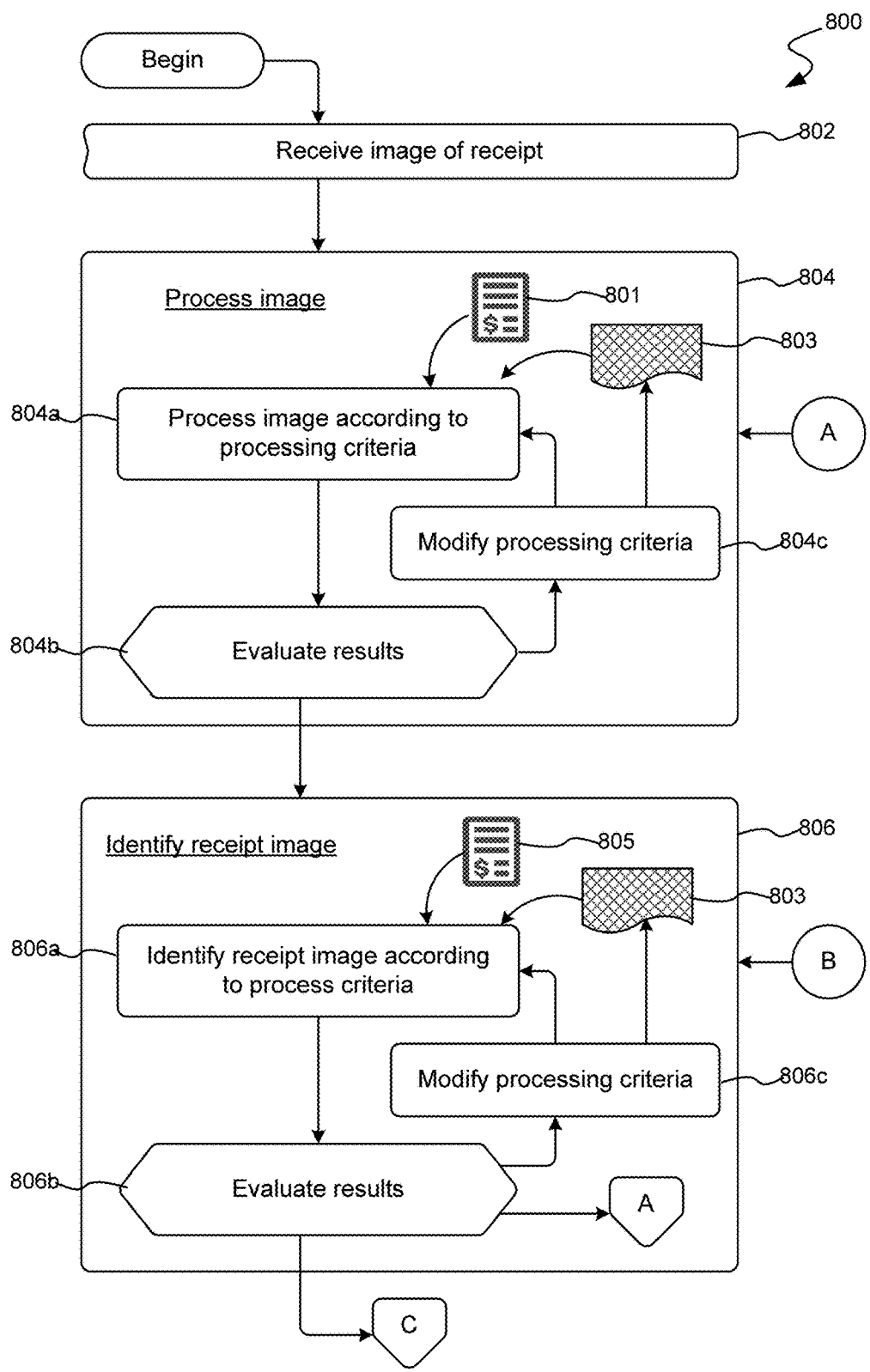
FIGS. 8A-8C illustrate an exemplary routine 800 suitable for enhanced processing of an image of a receipt.
Figure 8B:
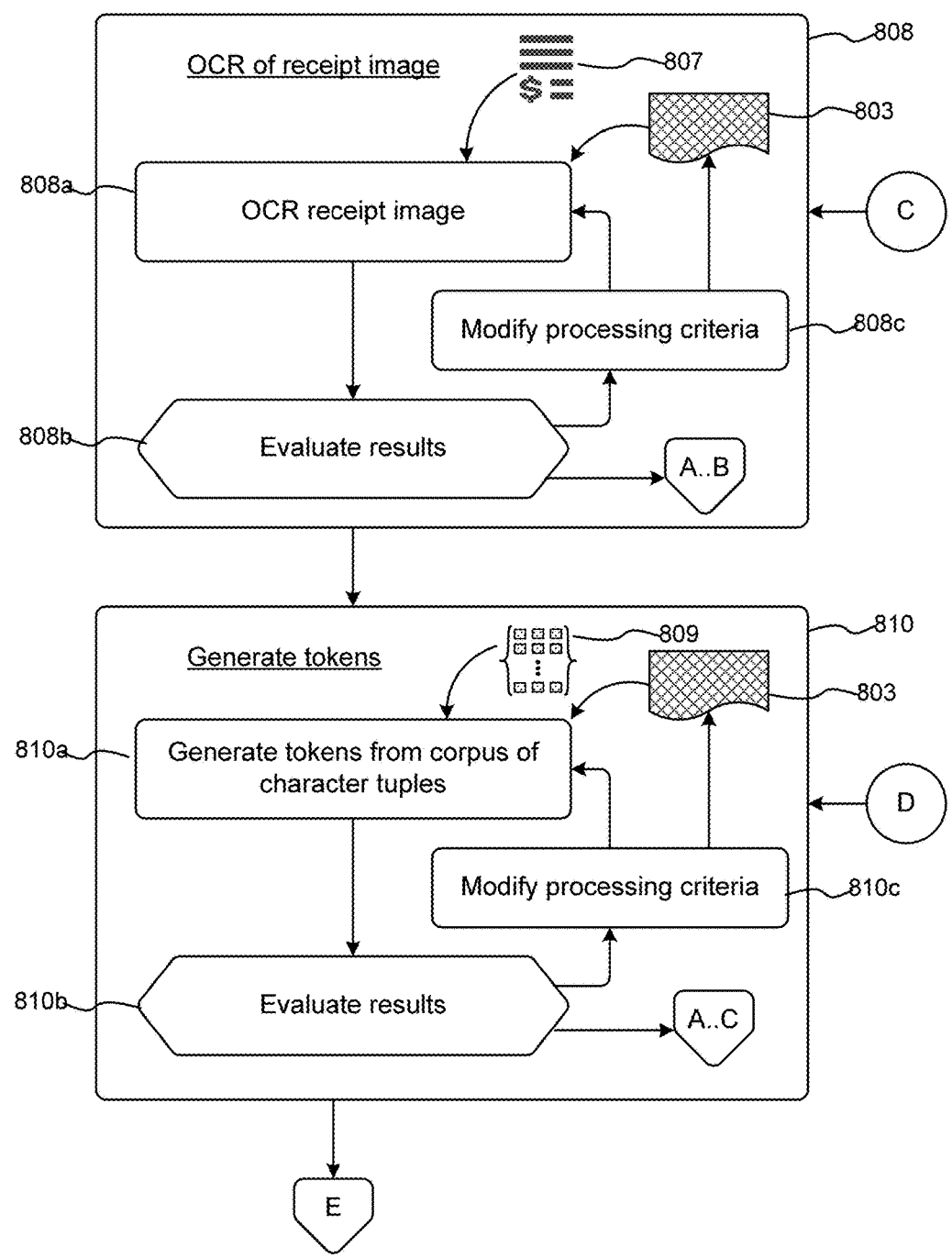
Figure 8C:
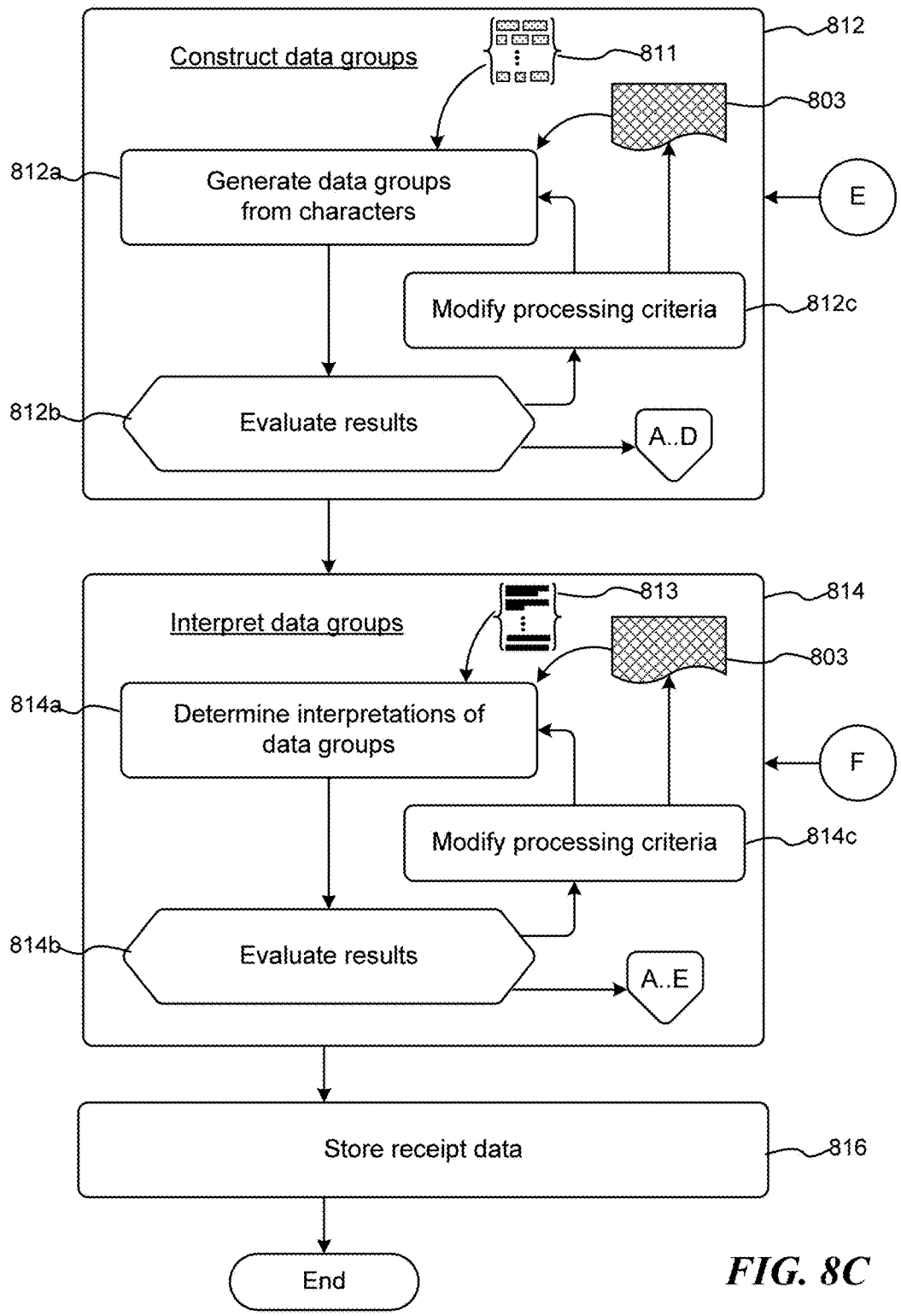

FIGS. 8A-8C show a flow diagram 800 suitable for enhanced processing of an image of a receipt, consistent with the states set forth in regard to FIG. 7. Beginning at block 802, an image of a receipt is received.

At block 804 the received image of the receipt 801 is processed. As shown in block 804, processing the image of the receipt 801 includes a step 804a of processing the image according to processing criteria 803. Processing the image of the receipt 801 according to processing criteria includes utilizing various filters and/or image adjustments with regard to the image of the receipt 801 in order to place the image in an optimal condition for further processing. Processing may include, by way of illustration and not limitation, adjusting the white balance of the image, adjusting contrast values of the image, rotating the image to align the receive image vertically and/or horizontally with processing coordinates, anti-aliasing, distorting the image to compensate for non-perpendicular alignment of the camera, and the like. Each of the applied processes is, for purposes of this disclosure, termed a processing filter that can be specified in the processing criteria 803 for processing the image of the receipt.

At step 804b, an evaluation of the resulting processing is conducted to determine whether the results of the processing are optimal, or whether they could be improved. The evaluation may illustratively include determining whether the content of the resulting processed image is correctly aligned with the Cartesian coordinates utilized in processing, whether any white balance or contrast adjustment should be modified. In short, the processed image is evaluated to determine whether it is in an optimal condition for further processing. If the evaluation determines that the resulting processed image may not be in optimal condition, at step 804c the processing criteria 803 is modified, after which all (or a portion) of the received image is again processed in step 804a.

In the event that the processing is repeated, at step 804b the evaluation considers whether the reprocessed results are superior to the previous processed results, and whether additional reprocessing (with modified processing criteria) is desired. This determination may be made according to threshold values in regard to a score that may be assigned to each of the processed results, comparative evaluative scores among two or more processed results, and the like. As indicated above, in reprocessing the received image, all or a portion of the received image of the receipt 801 may be reprocessed. In this manner, the processing steps 804a-804c are repeated until the evaluation results have identified an optimal, processed image among various iterations, or one that meets predetermined criteria in regard to processing the image. In order to ensure that processing does not continue without end, a predetermined number of iterations may be applied as well.

After identifying a processed image of the receipt 805, at block 806 a receipt image within the processed image is identified. Identifying the receipt image comprises the step 806a of identifying the receipt image according to the processing criteria 803 (that portion that pertains to receipt image identification.) By way of illustration and not limitation, filters regarding content alignment, anticipated/standard receipt widths, color differences, pattern identification—including tabular data, and the like may be applied to the processed image 805 in order to exclude all content of the processed image except for that content which is content of the receipt.

In similar fashion to step 804b above, at step 806b an evaluation of the resulting processing is conducted to determine whether the identification of a receipt image is optimal, or whether the processing could be improved with alternative filters applied. The evaluation may illustratively include determining whether the width of the identified receipt image corresponds to a standard with, whether an anticipated format of data is found, and the like. In short, the processed receipt image is evaluated to determine whether it is in an optimal receipt image for further processing. If the evaluation determines that the resulting processed receipt image may not be in optimal condition, at step 806c the process criteria 805 is modified, after which all (or a portion) of the processed image 805 is again processed in step 806a.

As in the case of step 804b, in the event that the processing is repeated, at step 806b the evaluation considers whether the reprocessed results are superior to the previous processed results, and whether additional reprocessing (with modified processing criteria) is desired. Determinations may be made according to threshold values in regard to a score that may be assigned to each of the processed results, comparative evaluative scores among two or more processed results, and the like. In this manner, the processing steps 806a-806c are repeated until the evaluation results have identified an optimal, processed image among various iterations, or one that meets predetermined criteria in regard to processing the image. Additionally, in order to ensure that processing does not continue without end, a predetermined number of iterations may be applied as well.

In addition to simply reprocessing the processed image 805, during the evaluation of the results of step 806b, a determination may be made that the processed image 805 is not optimal and should be reprocessed in block 804. In this event, the processing criteria 803 may be updated and processing returns (via Circle A) to block 304 as described above. Alternatively, once a receipt image 807 (FIG. 8B) is identified for further processing, the routine 800 proceeds to block 808 (FIG. 8B).

At block 808, an OCR (optical character recognition) is applied to the receipt image 807, the results of which is to generate a machine-encoded textual characters for the content of the receipt image. Indeed, the result of the OCR application includes, for each character, the machine-encoded character, the location/area within the receipt image 807 from which OCR application generated the machine-encoded character, and a score representing the confidence that the machine-encoded character accurately represents the content within the receipt image. The combination of machine-encoded character, location within the receipt image from which the character was interpreted, and confidence score is referred to herein as a character tuple.

At step 808a within block 808, the OCR process executed, according to processing criteria 803 relating to OCR processing, with regard to the receipt image 807 to generate the body of character tuples as indicated above. At step 808b, an evaluation of the corpus of character tuples is conducted to determine whether there are any anomalies within the corpus. By way of illustration and not limitation, an anomaly may be detected when an unexpected character is found. For example, in conducting the evaluation of the corpus of characters, if a character such as "§" is encountered within a receipt where English language characters are expected, such encounter may be viewed as an anomaly. Similarly, if a character such as "$" is encountered among other characters that appear to describe the name of a grocery chain (e.g., "Safeway"), such encounter may be viewed as an anomaly.

According to aspects of the disclosed subject matter, the evaluation of step 808b may detect/identify sufficient anomalies such that the OCR process of step 808a should be re-executed with modified processing criteria. This determination may be made according to a threshold number of anomalies detected, the type of anomalies that are detected, a combination of by quantity and type of anomalies, or other rating heuristics. If the determination is to reprocess the characters, at block 808c the processing criteria 303—particularly in regard to criteria applicable to the OCR process—are modified. Thereafter, the routing 800 returns to step 808a for reprocessing of the receipt image 807 to generate the corpus of character tuples for the receipt.

The evaluation may illustratively include determining whether the width of the identified receipt image corresponds to a standard with, whether an anticipated format of data is found, and the like. In short, the processed receipt image is evaluated to determine whether it is in an optimal receipt image for further processing. If the evaluation determines that the resulting processed receipt image may not be in optimal condition, at step 806c the process criteria 805 is modified, after which all (or a portion) of the processed image 805 is again processed in step 806a.

In regard to evaluating (step 808b) the results of the OCR process, an alternative determination may be made to reprocess the entire image of the receipt 801 or re-identify the receipt image within the processed image 803. As indicated (through Circle A or Circle B), the evaluation may determine any one of these options, or require reprocessing with regard to a particular area of the image. Also, with each reprocessing, the processing criteria 803 is updated to effect desired changes in the various processing stages. Moreover, the evaluation step 808b may retain the various results of each processing (or reprocessing cycle) such that it may ultimately make a determination among multiple iterations as to which corpus of character-tuples are optimal for further processing.

Due to changes in the processing criteria 803, the confidence score of each character tuple may be reduced. For example, if the OCR process without any processing criteria/restrictions were to identify a character as "§" with a confidence score of 81 (on a scale of 0 to 100), the resulting score for a character tuple in which the machine encoded character is "S" would likely be less in the condition where the processing criteria forced the OCR process to exclude using the "§" character. Due to this tendency of lessening scores by applying processing criteria, an external scoring may amend the confidence score of the character tuples in (or after) the OCR processing step 808a to compensate for the lessened score in light of external criteria that is sought. Continuing the example above, where the evaluation step 808b detects the "§" character as an anomaly, and where a reprocessing returns an "S" in its stead, the external scorer (e.g., the results scorer 640 of FIG. 6) may amend a lessened score, say 62, with a heightened score, say 92, due to expected/anticipated results. Of course, the external scorer (typically, though not exclusively, implemented as a cooperative process) is not constrained to increasing confidence scores: in some circumstances, the confidence score may be reduced by the external scorer.

After a determination in the evaluation step 808b to continue processing, the routine 800 proceeds to block 810. At block 810, tokens are generated from the corpus 809 of character tuples. More particularly, at step 810a, tokens are generated from the corpus of character tuples according to processing criteria 802 by an executable token generator (e.g., the token generator 628 of FIG. 6). Each token includes an aggregation of characters as well as the location/area the receipt image from which the token was generated. As indicated above, a token corresponds to one or more horizontally contiguous text characters that are displayable (non-whitespace characters). Contiguity is determined/delineated by white space: if two characters are separated by a white-space character (a white space intended to separate contiguous characters), the two characters are not contiguous.

At step 810b, an evaluation of the generated tokens is conducted. This evaluation reviews the various tokens to determine whether any anomalies are detected. In this instance, anomalies correspond to tokens that are, in some manner, unexpected. For example and by way of illustration, while a "$" character may pass through the evaluations of step 808b of block 808, a token that reads as "$pinach" may be flagged as anomalous. Similarly, a token that reads "Black.Label" may have been flagged as anomalous, suspecting that the "." character is actually an extraneous artifact and not actually a character of the receipt. Accordingly, the evaluation of results in step 810b evaluates the body of tokens that are generated by step 810a, flags anomalous tokens, and determines whether to reprocess the token generation according to updated processing criteria. This determination may be made according to threshold counts of anomalies, qualitative values of the anomalies, expected token results, and the like.

If the determination is to reprocess the generated tokens, at step 810c the processing criteria 803 is updated (particularly in regard to processing tokens) and processing returns to step 810a to reprocess the corpus of character tuples into a corpus of tokens according to the updated processing criteria. Alternatively, the determination may be to re-enter the processing at any one of blocks 804, 806 or 808 through Circle A, Circle B or Circle C. In any event, once a suitable corpus of tokens is generated, the routine 800 proceeds with the corpus to block 812 (FIG. 8C).

At block 812, the corpus 811 of tokens are constructed into data groups. As described above, data groups are defined as a group of tokens that are viewed as collectively forming a discrete element of the receipt (a receipt element). Each discrete element may comprise a set of data/information (constructed from tokens) corresponding to some item of content or transaction within the receipt, such as a purchased item or items including multiple instances of the same item (e.g., a data group corresponding to the purchase of two boxes of the same product), an address, an informational message, an address, a total and/or sub-total, tax information, purchase instrument information (cash, check, debit card, credit card, etc.), reward and/or loyalty data, store name and/or logo, etc. A data group typically corresponds to an item of receipt data that is stored with regard to the receipt. By way of illustration and not limitation, constructing data groups comprises aggregating tokens (and/or characters) horizontally that, according to analysis, appear to be a horizontally arranged set of content. However, data groups may also be constructed of tokens on multiple horizontal, contiguous lines.

At block 812a, the corpus of tokens is processed, according to the processing criteria 803 specifically relating to generating data groups, into a corpus of one or more data groups. As discussed above in regard to FIG. 6, the corpus of data groups is generated by a data group generator 630. After having generated at least a first corpus of data groups, at step 812b, an evaluation of the results is conducted. More particularly, the data groups are evaluated for anomalies: unexpected aggregations of content. By way of illustration, a data group that appears to identify two separate product items may be flagged as being anomalous as each data group is to be directed to a single transaction item within the receipt. At step 812*b*, according to various heuristics and predetermined thresholds based on quantity and quality of the detected anomalies, processing proceeds to block 812*c* where the processing criteria 803, particular corresponding to constructing data groups, is modified in some manner in order to correct the generation of anomalous data groups. Thereafter, processing returns to step 812*a* to reprocess all or some of the tokens.

In an alternative to modifying the processing criteria and reprocessing the corpus of generated tokens, at step 812*b* the evaluation may determine that it is advantageous to repeat a previous processing phase as identified in any of blocks 804, 806, 808 or 810 through Circles A-D. In reprocessing these previous processing phases, the processing criteria is typically updated prior to re-processing. Additionally, all or specific portions of the receipt content may be reprocessed.

At step 812*b*, after reprocessing (irrespective of how much was reprocessed), or if no reprocessing was necessary, an optimal corpus of data groups is provided to block 814 for interpretation of the various data groups.

At block 814, the various data group interpretations for the various generated data groups are determined according to processing criteria 803. These interpretations may comprise information such as, by way of illustration and not limitation, "loyalty reward data," "store address data," "unknown data," "purchased item," and the like. Correspondingly, at step 814, each of the data groups is examined to provide an interpretation of the content. At block 814*b*, the various interpretations are evaluated for anomalous conditions. An anomaly/anomalous condition may arise in the case that an interpretation of a data group is "unknown data." Alternatively, an anomalous condition may arise if there are multiple but distinct addresses for a given store. Of course, other conditions may give rise to an anomaly.

Based on the results of the evaluation of step 814*b*, the routine 800 may proceed to step 814*c* where the processing criteria corresponding to data group interpretations is updated and reprocessing occurs at step 814*a*. Alternatively, the evaluation of step 814*b* may determine a need to proceed to any of steps 804, 806, 808, 810 or 812 for reprocessing. As described above, a reprocessing request may specify reprocessing of all or only a portion of the content as well and processing criteria modifications.

Once a suitable set of interpretations for the generated data groups is established, the routine proceeds to block 816 where the generated results, data groups and interpretations, are stored as receipt data 636 in a data store 634 corresponding to the receipt that was provided in the image of the receipt 801. Thereafter, routine 800 terminates.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for processing a receipt, the method comprising:
  receiving an image of a receipt;
  processing the received image to identify receipt items corresponding to elements of the receipt, wherein the processing comprises:
    executing a first processing step comprising optical character recognition (OCR) processing of receipt content embodied in the received image according to first processing criteria corresponding to OCR processing, the first processing step resulting in a body of character tuples, each character tuple comprising a machine-encoded character, a location within the image of the receipt from which the character was interpreted, and a confidence score in the accuracy of the identification of the machine-encoded character;
    executing a second processing step comprising generating tokens from the body of character tuples according to second processing criteria corresponding to generating tokens, the second processing step resulting in a plurality of generated tokens;
    executing a third processing step comprising constructing data groups from the generated tokens according to third processing criteria corresponding to constructing data groups, the third processing step resulting in a plurality of constructed data groups; and
    executing a fourth processing step comprising determining an interpretation for each constructed data group according to fourth processing criteria corresponding to determining interpretations for data groups, the fourth processing step resulting in an interpretation for each constructed data group;
    in the course of processing the received image and executing any one of the first through fourth processing steps as a current processing step:
      evaluating the results of the current processing step for an anomaly; and
      upon detecting an anomaly:
        identifying target processing to address the anomaly, the target processing comprising at least one of the first through fourth processing steps executed previous to the current processing step;
        modifying at least one of the first through fourth processing criteria of the target processing; and
        performing the target processing according to the modified at least one of the first through fourth modified processing criteria, and performing at least one of the first through fourth processing steps subsequent to the target processing; and
    storing the receipt items of the receipt in a data store.

2. The computer implemented method of claim 1, wherein processing the received image to identify receipt items corresponding to elements of the receipt further comprises:
  executing a fifth processing step comprising identifying a receipt image within the received image according to fifth processing criteria, the fifth processing step resulting in the identification of a receipt image corresponding to an area of the received image containing content of the receipt.

3. The computer implemented method of claim 2, wherein processing the received image to identify receipt items corresponding to elements of the receipt further comprises:
  executing a sixth processing step comprising pre-processing the received image according to sixth processing criteria, the sixth processing step resulting in the generation of an optimal receipt image for processing.

4. The computer implemented method of claim 1, wherein performing the target processing according to the modified at least one of the first through fourth processing criteria comprises:
  performing the target processing according to the modified at least one of the first through fourth processing criteria; and performing any subsequent processing steps up to and including the current processing step in which the anomaly was detected.

5. The computer implemented method of claim 4, wherein evaluating the results of the current processing step for an anomaly further comprises:
scoring the results from the current processing step in which the anomaly was detected against the results from repeating the current processing step; and
continuing processing of the received image based on the higher scoring results.

6. The computer implemented method of claim 5, wherein detecting an anomaly of the results of any one of the first through the fourth processing steps comprises detecting an anomaly within the character tuples from the OCR processing.

7. The computer implemented method of claim 6, wherein detecting an anomaly within the character tuples from the OCR processing comprises detecting a threshold number of unexpected characters among the character tuples.

8. The computer implemented method of claim 7, wherein modifying the at least one of the first through fourth processing criteria of the target processing for which the anomaly was detected comprises modifying the processing criteria of the first processing step of the OCR processing to exclude the one or more unexpected characters as an OCR result for the OCR processing.

9. The computer implemented method of claim 5, wherein detecting an anomaly of the results of any one of the first through the fourth processing steps comprises detecting an anomaly within the generated tokens of the second processing step.

10. The computer implemented method of claim 9, wherein detecting an anomaly within the generated tokens of the second processing step comprises detecting a threshold number of unexpected text aggregations among the generated tokens.

11. The computer implemented method of claim 10, wherein modifying the at least one of the first through fourth processing criteria of the target processing for which the anomaly was detected comprises modifying the processing criteria of the first processing step of the OCR processing to exclude the one or more unexpected characters as an OCR result for the OCR processing.

12. The computer implemented method of claim 5, wherein detecting an anomaly of the results of any one of the first through the fourth processing steps comprises detecting an anomaly within the constructed data groups of the third processing step.

13. The computer implemented method of claim 12, wherein detecting an anomaly within the constructed data groups of the fourth processing step comprises detecting a threshold number of unexpected data group aggregations among the constructed data groups.

14. A computer readable medium bearing computer executable instructions which, when executed on a computing system comprising at least a processor retrieved from the medium, carry out a method for processing a receipt, the method comprising:
receiving an image of a receipt;
processing the received image to identify receipt items corresponding to elements of the receipt, wherein the processing comprises:
executing a first processing step comprising optical character recognition (OCR) processing of receipt content embodied in the received image according to first processing criteria corresponding to OCR processing, the first processing step resulting in a body of character tuples, each character tuple comprising a machine-encoded character, a location in the image of the receipt from which the machine-encoded character is extracted;
executing a second processing step comprising generating tokens from the body of character tuples according to second processing criteria corresponding to generating tokens, the second processing step resulting in a plurality of generated tokens;
executing a third processing step comprising constructing data groups from the generated tokens according to third processing criteria corresponding to constructing data groups, the third processing step resulting in a plurality of constructed data groups; and
executing a fourth processing step comprising determining an interpretation for each constructed data group according to fourth processing criteria corresponding to determining interpretations for data groups, the fourth processing step resulting in an interpretation for each constructed data group;
in the course of processing the received image and executing any one of the first through fourth processing steps as a current processing step:
evaluating the results of the current processing step for an anomaly; and
upon detecting an anomaly:
identifying target processing to address the anomaly, the target processing comprising at least one of the first through fourth processing steps executed previous to the current processing step;
modifying at least one of the first through fourth processing criteria of the target processing; and
performing the target processing according to the modified at least one of the first through fourth processing criteria, and performing at least one of the first through fourth processing steps subsequent to the target processing; and
storing the receipt items of the receipt in a data store.

15. The computer readable medium of claim 14, wherein performing the target processing according to the modified at least one of the first through fourth processing criteria comprises:
performing the target processing according to the modified at least one of the first through fourth processing criteria; and
performing any subsequent processing steps up to and including the current processing step in which the anomaly was detected.

16. The computer readable medium of claim 15, wherein evaluating the results of the current processing step for an anomaly further comprises:
scoring the results from the current processing step in which the anomaly was detected against the results from repeating the current processing step; and
continuing processing of the received image based on the higher scoring results.

17. The computer readable medium of claim 16, wherein detecting an anomaly of the results of any one of the first through the fourth processing steps comprises:
detecting an anomaly within the character tuples from the OCR processing;
wherein the anomaly comprises a threshold number of unexpected characters among the character tuples.

18. The computer readable medium of claim 15, wherein detecting an anomaly of the results of any one of the first through the fourth processing steps comprises:
- detecting an anomaly within the generated tokens of the second processing step;
- wherein the anomaly comprises a threshold number of unexpected text aggregations among the generated tokens.

19. The computer readable medium of claim 15, wherein detecting an anomaly of the results of any one of the first through the fourth processing steps comprises:
- detecting an anomaly within the constructed data groups of the third processing step;
- wherein the anomaly comprises a threshold number of unexpected data group aggregations among the constructed data groups.

20. A computer device for processing a receipt, the computer device comprising a processor and a memory, wherein the processor executes instructions stored in the memory as part of or in conjunction with additional components to process the receipt, the additional components comprising:
- a receipt processor that, in execution and in conjunction with additional components:
  - receives an image of a receipt;
  - captures receipt data from the receipt;
  - stores the captured receipt data in a data store in conjunction with the receipt; and
  - executes a plurality of processing steps to identify receipt items corresponding to elements of the receipt, wherein the plurality of processing steps comprise at least:
    - a first processing step comprising optical character recognition (OCR) processing of receipt content embodied in the received image according to first processing criteria corresponding to OCR processing, the first processing step resulting in a body of character tuples, each character tuple comprising a machine-encoded character, a location within the image of the receipt from which the character was interpreted, and a confidence score in the accuracy of the identification of the machine-encoded character;
    - a second processing step comprising generating tokens from the body of character tuples according to second processing criteria corresponding to generating tokens, the second processing step resulting in a plurality of generated tokens;
    - a third processing step comprising constructing data groups from the generated tokens according to third processing criteria corresponding to constructing data groups, the third processing step resulting in a plurality of constructed data groups; and
    - a fourth processing step comprising determining an interpretation for each constructed data group according to fourth processing criteria corresponding to determining interpretations for data groups, the fourth processing step resulting in an interpretation for each constructed data group;
  - wherein, the receipt processor, in the course of processing the received image and executing any one of the first through fourth processing steps as a current processing step:
    - evaluates the results of the current processing step for an anomaly; and
    - upon detecting an anomaly;
    - identifies target processing to address the anomaly, the target processing comprising at least one of the first through fourth processing steps executed previous to the current processing step; and
    - modifies at least one of the first through fourth processing criteria of the target processing;
  - wherein the receipt processor performs the target processing according to the at least one of the first through fourth modified processing criteria and at least one of the first through fourth processing steps subsequent to the target processing.

* * * * *